United States Patent [19]

Cossette et al.

[11] Patent Number: 5,367,416
[45] Date of Patent: Nov. 22, 1994

[54] SPINDLE GROUNDING DEVICE USING MAGNETIC FLUID

[75] Inventors: Luke A. Cossette; Zine-Eddine Boutaghou, both of Rochester, Minn.

[73] Assignee: International Business Machines Corporation, Armonk, N.Y.

[21] Appl. No.: 999,504

[22] Filed: Dec. 31, 1992

[51] Int. Cl.⁵ .................. G11B 33/14; G11B 17/02
[52] U.S. Cl. .................. 360/97.02; 360/99.08; 277/80
[58] Field of Search .............. 360/99.12, 99.08, 98.07, 360/97.01, 97.02; 277/80; 384/133

[56] References Cited

U.S. PATENT DOCUMENTS

| | | | |
|---|---|---|---|
| 4,526,484 | 7/1985 | Stahl et al. | 384/133 |
| 4,772,032 | 9/1988 | Raj | 277/80 |
| 4,898,480 | 2/1990 | Raj et al. | 384/446 |
| 4,985,792 | 1/1991 | Moir | 360/98.07 X |
| 5,007,513 | 4/1991 | Carlson | 192/21.5 |
| 5,009,436 | 4/1991 | Endo | 277/80 |
| 5,050,891 | 9/1991 | Ishikawa | 277/80 |
| 5,051,853 | 9/1991 | Hosoya | 360/99.08 |
| 5,092,611 | 3/1992 | Ehmser et al. | 277/80 |
| 5,100,159 | 3/1992 | Bras et al. | 277/80 |
| 5,108,198 | 4/1992 | Nii et al. | 384/133 |
| 5,134,331 | 7/1992 | Miyaji | 277/80 X |
| 5,191,811 | 3/1993 | Kogure | 277/80 X |

*Primary Examiner*—A. J. Heinz
*Attorney, Agent, or Firm*—Richard E. Billion

[57] ABSTRACT

The hub includes a cup attached to the hub or rotating portion of the disk drive. The cup has a top. Both the cup and top have openings therein which accommodate the fixed shaft. The cup is filled with ferrofluid. The portion of the shaft passing through the cup and top is magnetized so magnetic seals are formed at the openings. Electrical charge is transmitted to the shaft via the cup and the ferrofluid. A similar arrangement is shown for a disk drive having a rotating shaft in which the cup is incorporated into the hub and a magnetized pin attached to the housing is inserted into the cup.

20 Claims, 6 Drawing Sheets

SPINDLE GROUNDING DEVICE USING MAGNETIC FLUID

FIELD OF THE INVENTION

The present invention pertains to the field of disk drives which are also called direct access storage devices (DASD).

More particularly, this invention pertains to an apparatus and method for providing an electrically conductive path between rotating members in a disk drive.

Background of the Invention

One of the key components of a computer system is a place to store data. Typically, computer systems employ a number of storage means for archiving information and data. One place a computer can store data is in a disk drive, which is also called a direct access storage device.

A disk drive or direct access storage device includes one or more disks which look similar to 45 rpm records used on a record player, or compact disks which are used in a CD player. The disks are stacked on a spindle, much like several 45 rpm records waiting to be played. In a disk drive, however, the adjoining disks are fastened to the spindle and spaced apart so that the separate disks do not touch each other. Currently, available disks are about 1.3", 1.8", 2.5" and 3.5" in diameter. Disk drives having smaller diameter disks are also currently being worked on by many in the industry.

The surface of each disk is smooth and uniform in appearance. Data on the disks in a disk drive is not stored in grooves. Each of the surfaces is, however, divided into portions where data is stored. Each disk surface has a number of data tracks situated in concentric circles like rings on a tree. Each track in a disk drive is further subdivided into a number of sectors which is just one portion of the circumferential track.

Disks in a disk drive are made of a variety of materials. The substrate or inner core can be made of glass, plastic or metal. In the case of magnetic recording, a magnetizable layer of metal is placed on the substrate or inner core. Data is stored on the disk by magnetizing a portion of the magnetizable layer of the disk. The portion magnetized will be one or more of the sectors mentioned above.

In order to magnetize the surface of a disk, a small ceramic block containing an electromagnetic transducer known as a read/write head is passed over the surface of the disk at specific tracks and sectors. More specifically, the read/write head is either flown on a cushion of air or rides on a liquid lubricant at a height of less than approximately six millionths of an inch from the surface of the disk as the read/write head is energized to various states causing a domain within a sector in the track below to be magnetized.

To retrieve data stored on a magnetic disk, the read/write head is passed over the disk. The small magnetized portions of the disk induce a current in conductors associated with the read/write head. By looking at current from the wires of the read/write head and decoding the pattern, the data can be reconstructed and used by the computer system.

Like a record, both sides of a disk are generally used to store data or other information necessary for the operation of the disk drive. Since the disks are held in a stack and are spaced apart from one another, both the top and the bottom surface of each disk in the stack of disks has its own read/write head.

The ceramic block and the magnetic transducer it holds are moved over the surface of a disk using an actuator arm that compares to the tone arm in a stereo record player. The actuator arm of a disk drive, holds all the transducers or read/write heads, one head for each surface of each disk, in a structure that looks like a comb. The structure is also commonly called an E block.

Problems can occur in a disk drive when the electrical charge on the disk or disks differs from the electrical charge on the read/write heads. In a disk drive, the magnetic disks rotate as the read/write heads are passed over the disks. Such different amounts of electrical charge can be due to static electricity buildup due to the rotation of the disks or due to an electrostatic discharge to the disk drive. The electrical charge of the read and write elements and the electrical charge of the disks can also differ if the read and write elements are biased electrically. When using some types of read and write elements, such as those associated with a magneto-resistive head, the elements are biased or electrically charged so they work properly.

The problems that can occur when the electrical charge on the disk is different from the electrical charge on the read/write element or on the slider include the electrostatic discharge or a spark jumping across the space between the read/write elements and the disks. Such a spark may damage the magnetized portions of the disk resulting in loss of data. Likewise, the read/write elements of the heads are often destroyed during such events. A magneto resistive read head is very susceptible to damage due to electrostatic discharge. Loss of data or the read/write heads for reading data or writing data is very undesirable since either data or the transducer needed to get at the data is destroyed.

Currently, many disk drives have a spindle assembly which includes a fixed shaft. The spindle assembly also includes a hub attached to the shaft so it can rotate about the shaft. The disks are attached to the hub. The hub rotates with the aid of two sets of spindle bearings and spindle races. A motor inside the spindle assembly turns the hub and the disks attached to the hub. The internal space of the spindle assembly which houses the motor is sealed from the atmosphere surrounding the disks using a seal containing a liquid which conducts electricity. Currently, the electrical path used to prevent different electrical charges on the disks as compared to the read and write elements has been the electrical path through this electrically conducting liquid seal. The resistance to the flow of electrical current from the motor hub to the shaft changes drastically since the balls in the spindle bearings sometimes make contact between the hub and the shaft races. When the ball bearings do not make this contact, the fluid's resistance to the flow of electricity is very high (in the mega-ohm range) and is not low enough to always prevent an undesirable electrostatic discharge between the disks and the read/write elements of the heads. The resistance across the magnetic fluid seal is also not low enough to allow electrical buildup to pass which would prevent electrostatic discharge. In addition, the electrical path through the seal does not prevent an unwanted electrical charge differential between the read/write elements of a sensitive magneto-resistive head and the disks.

Several devices have been used to ground a rotating shaft. One such device is shown in Japanese document JP55-32231. This document discloses a grounding unit for a rotating axis. In this device, a probe is placed into a space created by a sink member and a couple of yokes. A magnetic fluid having conductive corpuscles is placed in the space. A magnet, a u-shaped heel piece and a couple of yokes form a magnetic path. The probe is inserted between the yokes 5.

The device shown in JP55-32231 has several disadvantages. First of all there appears to be no seal near the end of the probe attached to the shaft. The absence of a seal presents the threat of contamination in the disk drive from the magnetic fluid in the sink. This contamination would be very detrimental since magnetic particles could move across the disk surface and demagnetize whole sections of data and then move to other sections. Loss of data is a serious problem since data integrity is the ultimate goal of a disk drive. In addition, the device requires assembly of several components within the heel piece 4. The magnets, the sink member 6 and the yokes 5 must be inserted into the heel piece. Inserting all these pieces would be very cumbersome and time consuming in a manufacturing operation where the simpler the assembly the better.

Another grounding device for a rotating shaft is shown in Japanese Document JP56-140569. The rotating shaft has an opening therein. A mandrel of ferromagnetic material is inserted within the opening. The mandrel is fixedly attached to the frame of the device. An annular magnet and a yoke are also attached to the frame. Ferrofluid is injected within the opening after the mandrel is inserted within the opening in the shaft. The shaft conducts to the mandrel via the ferrofluid to ground the shaft.

This arrangement has disadvantages. Among the disadvantages are that the assembly once again has many pieces which is not conducive to simple manufacturing. Also complicating the manufacturability of this device is that the ferrofluid has to be injected after the mandrel is inserted into the hole or opening in the shaft. Still another disadvantage is that the arrangement takes up considerable amounts of height in that an annular magnet and a yoke must be placed on the frame of the device to which the rotating shaft is to be grounded. With the constant pressure to reduce the height of the disk drives (such as producing "half high form factor" drives) such a height hogging arrangement is not desirable. Even if it can be accommodated in one disk drive, the half high version would have to be redesigned.

Another arrangement shown in U.S. Pat. No. 4,526,484 issued to Stahl is not directed to an arrangement for grounding but is actually for providing a ferrofluid thrust and radial bearing assembly. The arrangement includes a nonmagnetic housing 12 which has a machined out portion with a thrust bearing surface 16 and a portion that holds a magnet 18 and pole pieces 20. This is merely a ferrofluid seal for a liquid bearing. This arrangement is again difficult in terms of manufacture. The casting would have to be machined to produce the thrust bearing surface and the surface which holds the magnet and pole pieces. In addition, the ferrofluid used would not have the proper amount of conductivity.

The above mentioned arrangements all have problems. There is a need for a simple method for grounding rotating shaft which can be used with a cast part to simplify the assembly during manufacture. In addition, there is a need for a grounding device that is easily loaded with an electrically conductive fluid during assembly or an arrangement in which the fluid can be loaded prior to inserting the shaft during the manufacture of the device. Furthermore there is a need for a space saving design that can be used in any orientation without regard to gravity. Of course, the arrangement must be effective in grounding the shaft so as to assure that the transducing head of the disk drive is protected. This is particularly vital when using a magnetoresistive head.

Furthermore, there is a need for providing an electrical path capable of having low wear and a long life and adapted to a high speed application.

SUMMARY OF THE INVENTION

Disclosed is a method and apparatus for providing a reliable, consistent, low resistance, electrical path between the shaft and the hub of a spindle assembly of a disk drive.

Disclosed is a disk drive including a rotating spindle portion. Depending on the design of the disk drive, either the shaft rotates or a portion attached to the shaft, typically called the hub, rotates. The shaft is fixed when an in hub motor is used to rotate the hub and the shaft usually rotates when a below the hub flat or pancake motor is used to rotate the disks. The disk drive also includes a housing to which the rotating portion is mounted for rotation, a cover to protect and maintain an environment within the disk drive and a transducer which is moved with an actuator to various locations on the disks of the disk drive.

Attached to the rotating portion of the spindle is a grounding shaft. At least a portion of the grounding shaft is a magnetized pin. In the instance of a spinning hub, the ground shaft is smaller in diameter than the hub. In the instance of a rotating shaft, the grounding shaft may be the same in diameter or smaller. In order to reduce the complexity of manufacture, the grounding portion of the rotating shaft is usually an end of the rotating shaft. A cup is provided on the housing of the disk drive. The cup is cast into the housing and positioned such that the grounding portion of the shaft is received within the cup upon assembly. The cup is filled with a conductive ferrofluid before the magnetized pin is inserted into the cup. Advantageously, the casting does not have to be machined an additional time. In the case of a disk drive with a fixed shaft, the rotating portion of the disk drive is provided with a cup. The cup has two openings therein. The fixed shaft passes through the two openings. The portion of the shaft which extends into the cup is magnetized. The amount of ferrofluid is determined from the finished geometry. The magnetized shaft produces a magnetic seal near the portion of the cup nearest the disks. The grounding shaft is also short to accommodate height saving designs. In operation, the shaft spins in the magnetic fluid filled cup. The arrangement is also easy to manufacture since additional machining of the cup is not required.

Another advantage is that this particular physical arrangement minimizes the amount of space required. This space saving advantage is critical since the disk drive industry is constantly moving to smaller and smaller disk drives having lower heights. Currently, disk drives on the market feature form factors for 3.5" disks, 2.5" disks and 1.8" disks. Some of the current 2.5" form factor disk drives have a height of one-half inch. As technology progresses, the size of disk drives will decrease further, so a space saving design is always advantageous. Still another advantage is that Low grade, less expensive ferrofluids with high particle (conductive) size can be used in this arrangement to provide a resistance substantially lower than ferrofluid seals, such as the one described in U.S. Pat. No. 4,526,484.

BRIEF DESCRIPTION OF THE DRAWINGS

For a better understanding of the present invention, reference can be made to the accompanying drawings, in which.

These drawings are not intended as a definition of the invention but are provided solely for the purpose of illustrating the preferred embodiments of the invention described below.

DETAILED DESCRIPTION OF THE PREFERRED EMBODIMENT

Figure 1:
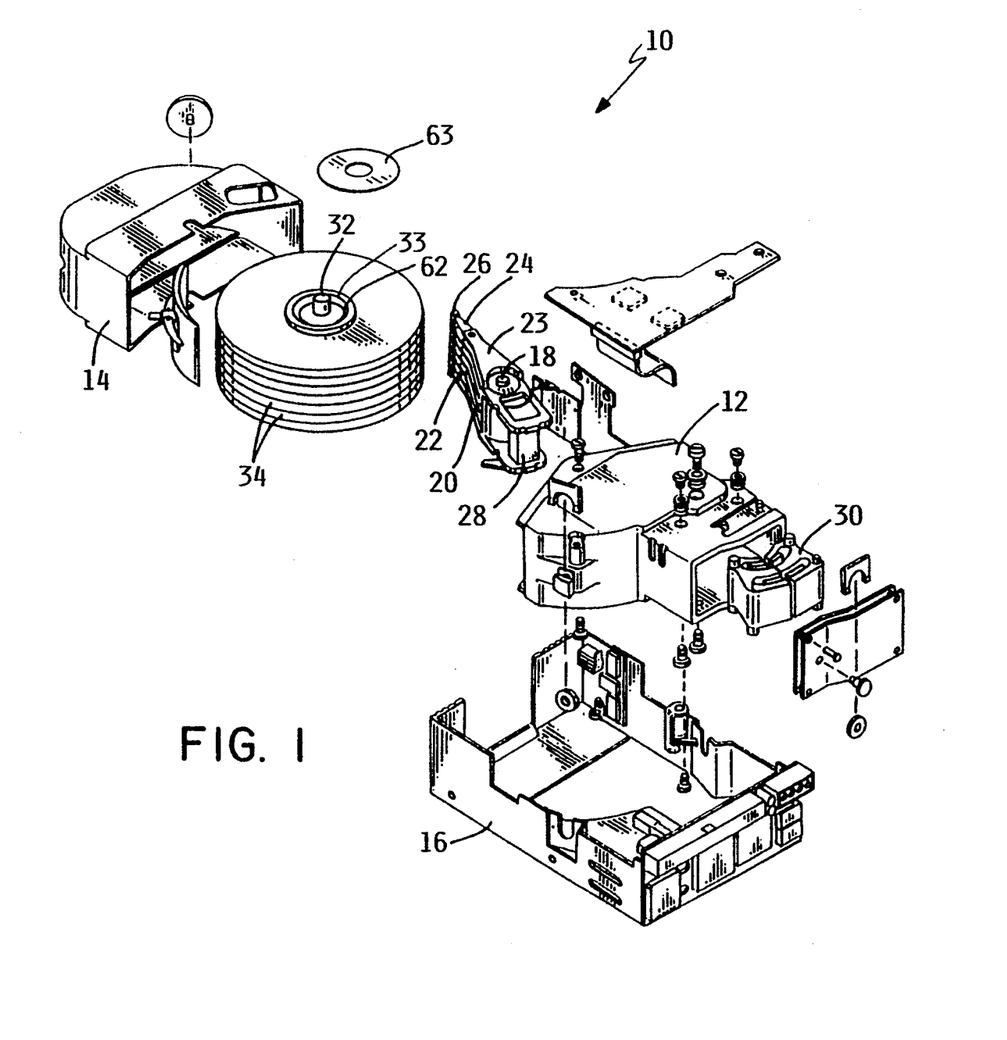
FIG. 1 is an exploded view of a disk drive embodying this invention.

The invention described in this application is useful with all mechanical configurations of disk drives or direct access storage devices ("DASD"). FIG. 1 is an exploded view of a disk drive 10. It should be noted that although a rotary actuator is shown, the invention described herein is also applicable to disk drives with linear actuators. It should also be noted that this invention is equally applicable to disk drives having fixed spindle shafts and rotating spindle shafts. The disk drive 10 includes a housing 12, and a housing cover 14 which, after assembly, is mounted within a frame 16. The housing 12 and the housing cover 14 form a disk drive enclosure. Rotatably attached within the housing 12 on an actuator shaft 18 is an actuator arm assembly 20. The actuator arm assembly 20 includes an E block or comb like structure 22 having a plurality of arms 23. Attached to the separate arms 23 on the comb or E block 22, are load springs 24. Attached at the end of each load spring is a slider 26 which carries read/write elements (not shown in FIG. 1). On the other end of the actuator arm assembly 20 opposite the load springs 24 and the sliders 26 is a voice coil 28.

Attached within the housing 12 is a pair of magnets 30. The pair of magnets 30 and the voice coil 28 are key parts of a voice coil motor which applies a force to the actuator assembly 20 to rotate it about the actuator shaft 18. Also mounted within the housing 12 is a spindle shaft 32. The spindle shaft 18 in the disk drive shown in FIG. 1 is fixed. A hub assembly 33 is rotatably attached to the spindle shaft 32. The spindle assembly 31 includes the spindle shaft 32 and the hub assembly 33. A number of disks 34 are attached to the hub assembly 33. In FIG. 1, eight disks are attached to the hub assembly 33. As shown in FIG. 1, the disks 34 are attached to the hub assembly 33 with equal spacing between each disk.

Figure 2:
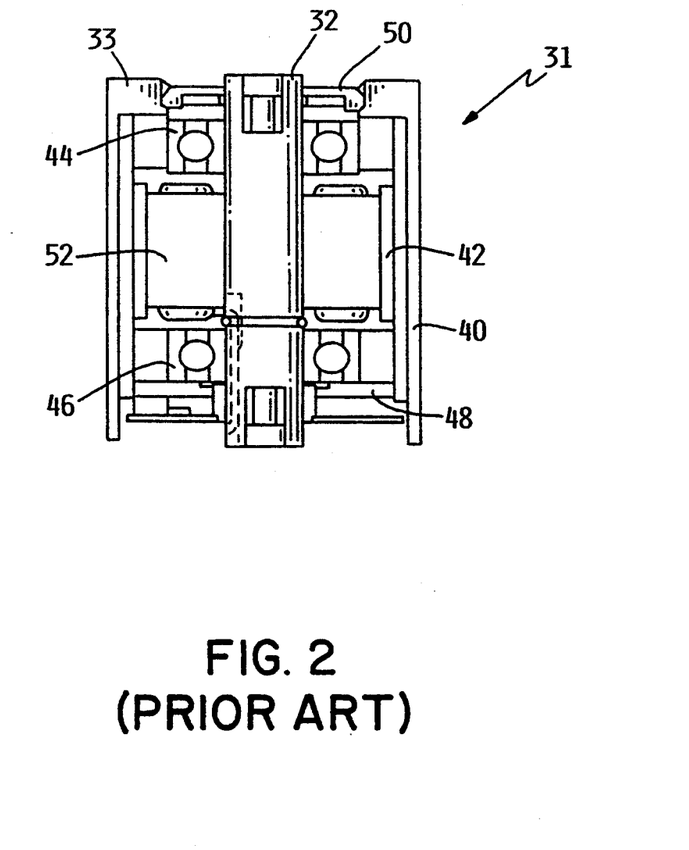
FIG. 2 is a cross sectional view of a prior art in hub motor for a disk drive.

Now turning to FIG. 2, the spindle shaft 32 and hub assembly 33 which is grounded only through magnetic fluid seals will be detailed. The hub assembly includes a hub 40, hub magnets 42, a first bearing set 44, and a second bearing set 46. Attached to the housing 12 is a motor stator 52 which is a set of coils through which electrical current passes. In operation, the stator 52 on the housing 12 and the hub magnets 42 attached to the hub 40 form an electrical motor used to rotate the hub 40 and the disks 34 which are attached to the hub. Electrical energy is input to the stator so that the polarity of the stator is constantly changing and rotating. The hub magnets 42 on the hub 40 follow the changing polarity. In a disk drive, the motor rotates the hub and disks attached thereto in excess of 3500 revolutions per minute. Currently disk drives rotate at 3600 RPMs.

The first bearing set 44 is attached to one end of the spindle shaft 32 and to the hub 40. The second bearing set 46 is attached to the other end of the spindle shaft 32 and the hub 40. The first and second bearing sets allow the hub 40 to spin or rotate easily as the motor rotates the hub 40. The motor is sealed from the disk drive enclosure, formed by the housing 12 and the housing cover 14 (see FIG. 1). The electrical path or ground path in this prior art embodiment relied on the electrical path through the magnetic fluid seal 50, and upon the electrical path created when the ball bearings in one of the first or second bearing sets happened to be physically positioned to produce a good conductive pathway. In other words, at ally point in time, the ball bearings may be contacting one race or the other, floating between the races or contacting both the race near the spindle shaft 32 and the race near the hub 40.

Figure 3:
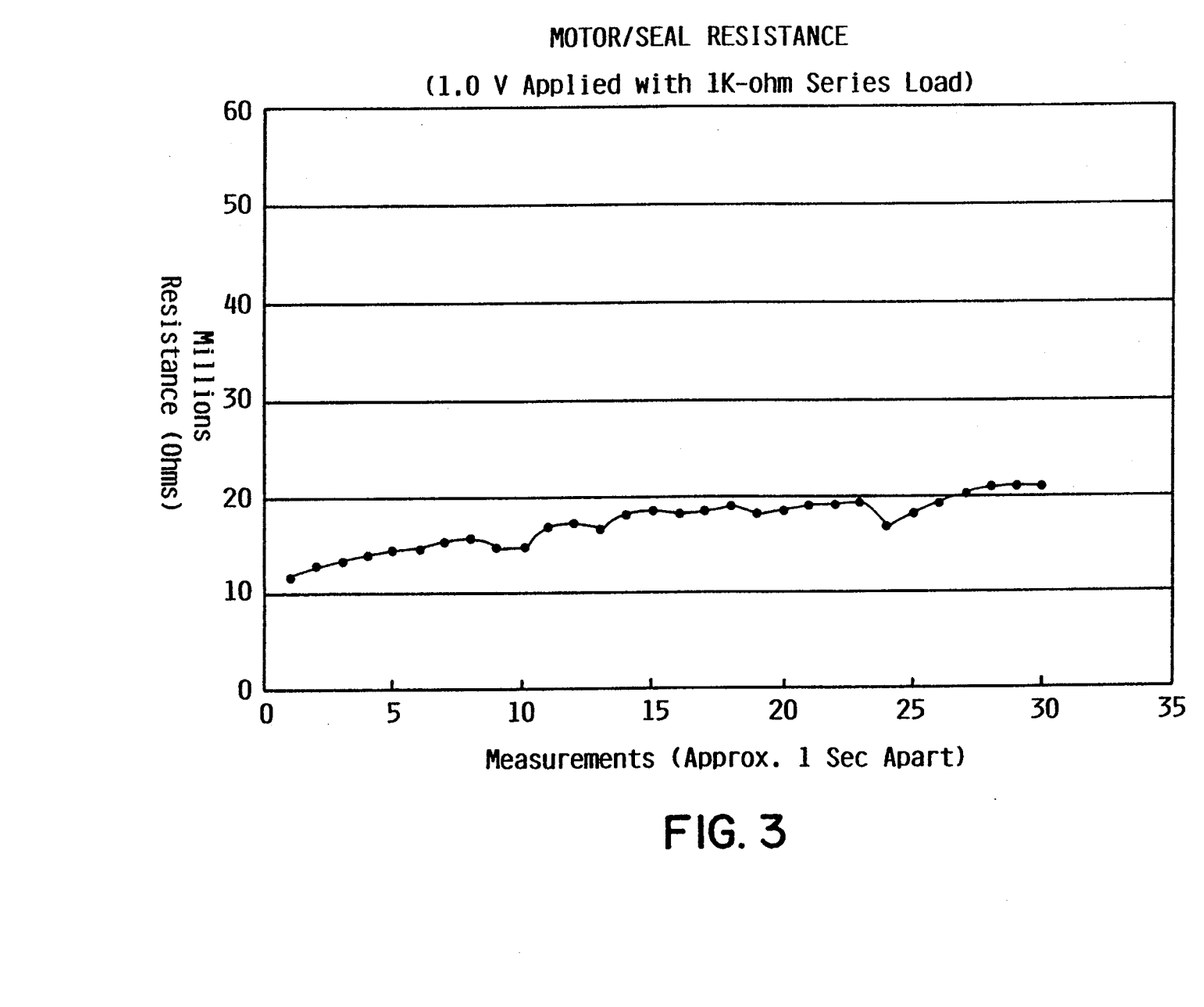
FIG. 3 is a plot showing resistance in ohms to current flow across the conductive magnetic fluid seal in a disk drive device without the invention.

FIG. 3 is a plot of the resistance to conducting electricity between the spindle 32 and the hub 40 with respect to time in the prior art device shown in FIG. 2. FIG. 3 shows that the resistance is generally high with a resistance in the range of 12 to 22 mega-ohms. This is the resistance across the magnetic fluid seal 50 that is relied on for a ground path. In addition, short duration decreases in the spindle resistance (not shown) occur, reflecting the times when the ball bearings happen to be physically positioned to produce a ground path between the spindle shaft 32 and the hub 40. In summary, the resistance between the hub and the shaft is generally high and drops on occasion when the ball bearings in one of the first bearing set 44 or the second bearing set 46 provides a physical path between the hub 40 and the spindle shaft 32.

Another problem with the prior art approach of relying on the magnetic fluid seal 50 for a conductive path between the hub 40 and the spindle shaft 32, is that the resistance of the magnetic fluid in the seal 50 increases over extended lengths of time due to the evaporation of fluid over time.

Figure 4:
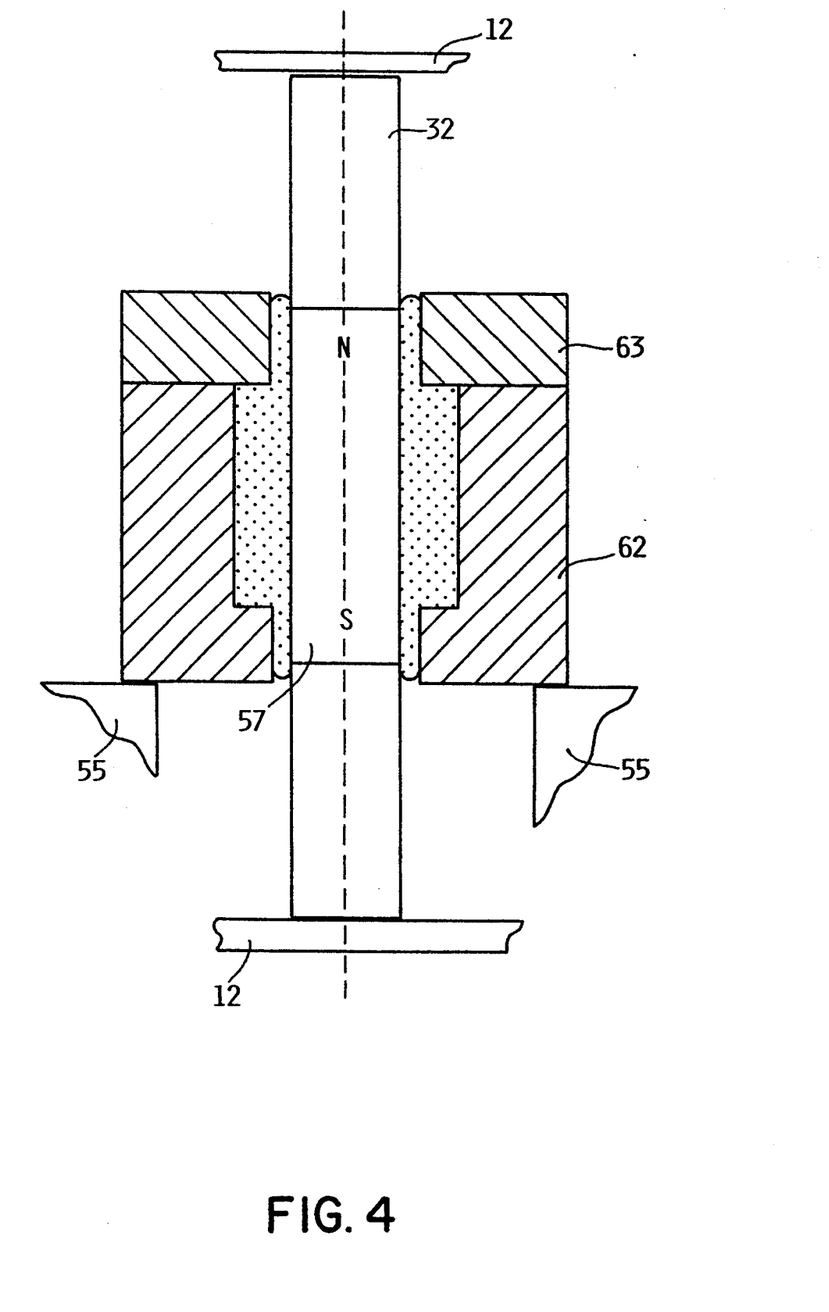
FIG. 4 is a schematic view showing the invention used on a disk drive with a fixed shaft.

The spindle shaft 32 and portion of the hub assembly 33 shown in FIG. 4 solves all of the problems attendant with the prior art. FIG. 4 is a partial showing of the major components of the invention. Most of the remaining components of the disk drive have been removed in this drawing for the purpose of clarity. Most of the portion which rotates and would obscure this view have been designated generally as the rotating portion 55 of the hub assembly. In FIG. 4, the fixed spindle shaft 32 is shown with a magnetized portion 57. The magnetized portion 57 is made by bonding a magnet or magnetized portion into the shaft 32 or by merely selectively magnetizing a portion of the shaft 32.

A separate cup 62 is attached to the rotating portion 55 of the disk drive. The cup has a top 63 which fits the cup 62. The cup 62 and top 63 each have an opening therein. The openings accommodate the shaft 32 and let it pass therethrough. The magnetized portion 57 of the shaft 32 terminates on the shaft 32 so that it is positioned near the outermost edge of the cup 62 and top 63. Preferably, the magnetized portion terminates at about three-fourths the thickness toward the outside of the cup 62 and top 63. This provides for the best magnetic seal being formed. Of course, the size of the openings in both the cup 62 and top 63 are selected so as to produce a good magnetic seal about the shaft 32. Of course, the cup 62 and top 63 must be of ferromagnetic material so that lines of flux can be carried to form the magnetic seal. It is contemplated that the cup 62 attached to the rotating portion 55 be of ferromagnetic material. It is also contemplated that the top is attached to the cup 62 of another portion of the rotating portion 55. If attached to another of the rotating portion, the cup could be filled during assembly and the top 63 would be put in place as a part of another assembly step if it was incorporated into another piece of the rotating portion 55. The top 63 could also be set in place in a separate step after the cup 62 is filled with ferrofluid. In operation, electrical charges would be carried from the rotating portion 55 through the cup 62 or top 63, across the ferrofluid and to the shaft 32.

Figure 5:
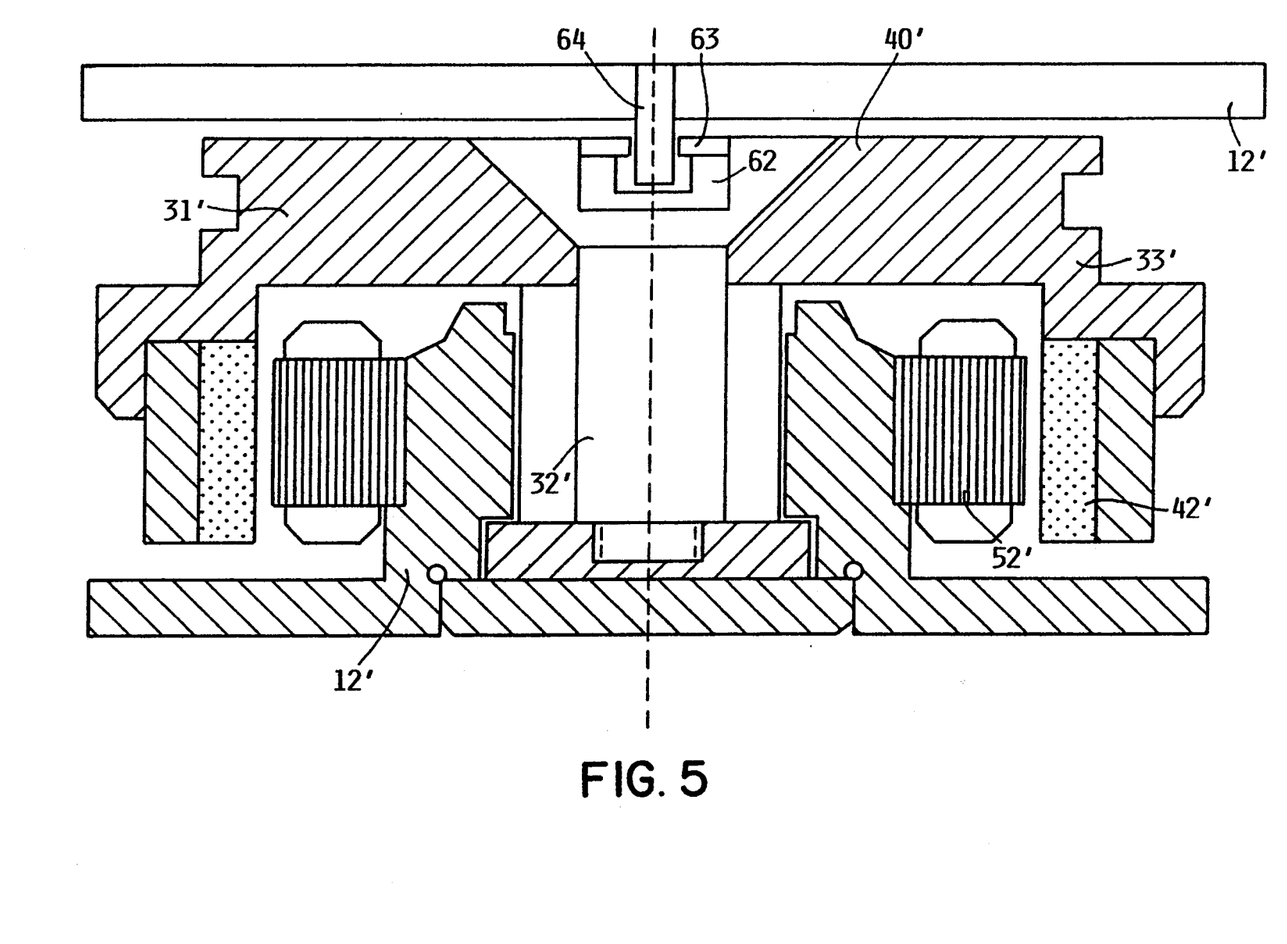
FIG. 5 is a cross sectional view of an in hub motor for a disk drive having a rotating shaft employing the disclosed invention.

Now turning to FIG. 5, a disk drive 10 with a rotating spindle shaft 32' is shown. FIG. 5 shows an embodiment which accommodates the rotating spindle shaft 32'. The structure of the inventive spindle shaft 32' and hub assembly 33' has some similar parts to the device shown in the previous figures. The similar parts are designated with primes. The spindle assembly 31' includes the spindle shaft 32' and the hub assembly 33'. The hub assembly 33' includes a hub 40' and hub magnets 42'. Rather than having a bearing set, an oil bearing is used to provide a smooth surface on which to spin the rotor. Attached to the housing 12' is a stator 52' which is a set of coils through which electrical current passes. As with the prior art device, in operation the stator 52' on the spindle shaft 32' and the hub magnets 42' attached to the hub 40' form an electrical motor which is used to rotate the hub 40' and the disks 34' which are attached to the hub 40'.

In addition, the spindle assembly 31' includes an opening or cup 62 in the rotating hub 40'. In FIG. 5 an actual cup is shown. It should be noted that if the hub portion is ferromagnetic, a separate cup would not be needed. The cup could be incorporated into the hub. Attached to the housing 12' is a pin 64. The housing is typically made of a material that is very light and corrosion resistant such as aluminum. Aluminum, of course, is not ferromagnetic. The pin 62 is made of a magnetic material or is made of steel and then magnetized. One end of the pin is attached to the housing 12' so that it is in intimate electrical contact with the housing. The other end of the pin 64 fits within the opening 62 in the hub 40'.

During the manufacture of the hub assembly 33' shown in FIG. 5, the cup or opening 62 is filled with a ferrofluid 66. Assembly is eased by this specific arrangement since the step of filling the cup 62 can be easily inserted into the steps for assembling the disk drive. The manufacturing steps are to build the disk stack and use a screw 68 to attach the hub 40' to the shaft to finish the disk stack. The screw 68 has an opening 62 therein. The opening is filled with a predetermined amount of ferrofluid 66. The opening 62 is not filled to its capacity during manufacture but filled so that when the pin 64 is inserted into the opening or cup 62 the ferrofluid and the pin will essentially fill the cup. After the cup 62 is filled with ferrofluid, the housing cover is placed onto the disk drive to form the disk enclosure. The housing cover can have the pin 64 already set in the cover so that placing the housing cover onto the disk drive finishes the assembly. Another option is to place the housing cover onto the disk drive and then to press the pin 64 through the opening in the housing cover and into the opening or cup 62. This series of steps lends itself to manufacturing since the ferrofluid can be easily injected into the opening before the pin 64 is inserted into the cup.

The inventive grounding mechanism also has several other advantages. For example, the ferrofluid in combination with the magnetized pin serves to seal the opening and to conduct any electrical charge to prevent any buildup of charge on the disks. Another advantage is that there is no pressure differential which also must be sealed as with a ferrofluidic seal across the bearings. Because there is no pressure differential which must be sealed, the ferrofluid that is used can be cheaper. The more expensive ferrofluids have finer magnetic particles suspended in the fluid. The less expensive ferrofluids have larger magnetic particles suspended in the fluid which, by the way, are more electrically conductive. Thus, the arrangement of a magnetic or magnetized pin in an opening or cup allows the use of less expensive, more conductive ferrofluid. Still a further advantage is that additional magnets are not needed to form the ferrofluid seal. This saves height. As a matter of fact, the arrangement shown in FIG. 4 uses little if any additional height. The pin is attached to the casting and the pin extends into the opening or cup 62 in the hub 40'. The pin fits within the space already provided. Another advantage of the inventive arrangement is that when the diameter of the pin 64 is close to the diameter of the opening or cup 62, the pin 64 conducts electrical charge near the cup and also throughout its entire length. As is well known, electricity will travel along the path of least resistance which is where the ferrofluid seal is formed. Some electrical charge will be carried along the length of the shaft 32'.

It should also be noted that the pin 64 can be attached to the hub 40' or rotating portion of the drive. This would be the reverse of the arrangement shown in FIG. 5 where the pin is attached to the fixed portion or housing 12'. The reverse arrangement is not the preferred embodiment since the housing is not made from a ferromagnetic material which would conduct lines of flux to form a magnetic circuit. Since the housing is not ferromagnetic, a cup 62 made of ferromagnetic material would have to be added to the housing 12' so that the pin could make a magnetic seal.

Figure 6:
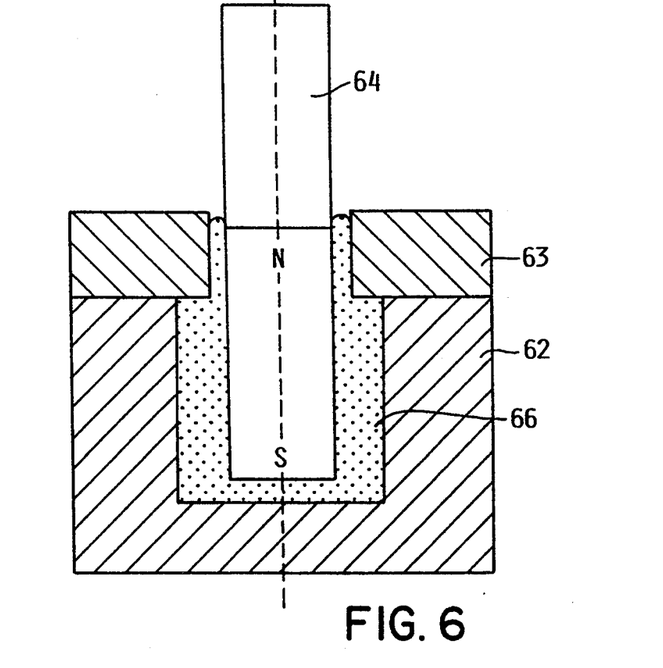
FIG. 6 shows a schematic of the invention.

Now turning to FIG. 6, the inventive pin 64 and cup 62 arrangement is shown in schematic form. In FIG. 5, the cup 62 is shown with an annular top 63. The cup 62 would have a top 63 if the diameter of the cup 62 is substantially oversized with respect to the diameter of the pin 64. The top 63 can be similar to a thin washer made of ferromagnetic material. The diameter of the opening in the top 63 is slightly larger than the diameter of the magnetic or magnetized pin 64. Preferably, the pin 64 is magnetized along a portion of its length so that one of the poles of the magnetized portion terminates proximate the top 63 on the cup 62. This has certain advantages in terms of sealing which will be discussed with respect to FIG. 7. It should be noted that terminating the magnetized portion near the top of the opening or cup 62 in a ferromagnetic material has the same advantages which will be discussed with respect to FIG. 7. It should also be noted that a pin can be controllably magnetized on only a portion of the length of the pin 64 as is well known in the art. The pin's 64 magnetized portion can also be formed by attaching or bonding a separate magnet to the pin 64.

Figure 7:
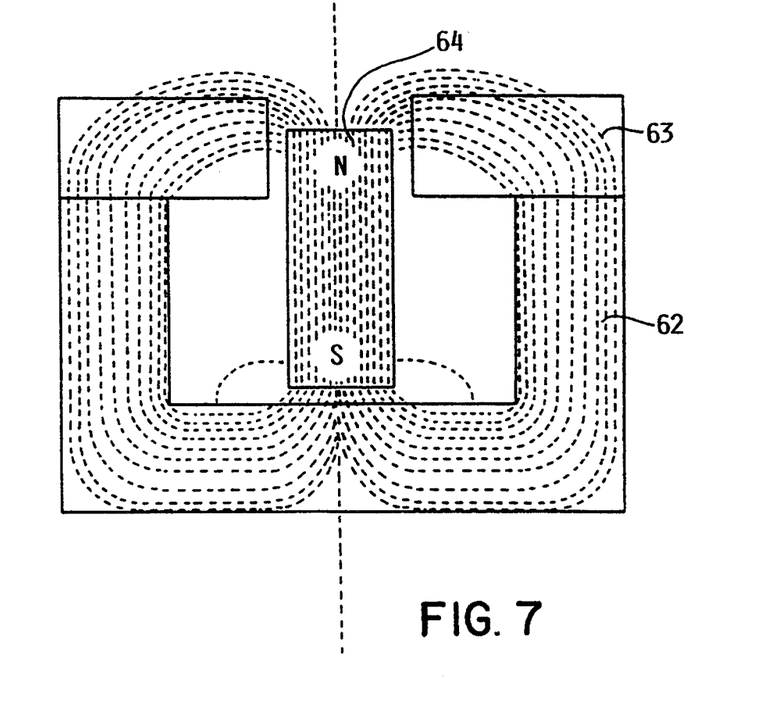
FIG. 7 shows a schematic of the invention with lines of flux.

FIG. 7 shows where the lines of flux occur within the pin 64, cup 62 and top 63 arrangement shown in FIG. 6. In FIG. 7, the pin 64 seems short. However, what is really being shown is the magnetized portion of the pin 64. When the pin 64 is magnetized so that one end of the magnetized portion terminates near the top of the opening or cup 62, then lines of flux are concentrated near the top of the opening or cup 62. This concentration of lines of flux provides for the best sealing with the ferrofluid as possible. In addition, the lines of flux are concentrated at the bottom of the pin 64 which is positioned near the bottom of the cud or opening 62. Electrical conduction occurs along the entire length of the pin 64 as the ferrofluid contacts the pin 64.

The present invention and the best modes of practicing it have been described. It is to be understood that the foregoing description is illustrative only and that other means and techniques can be employed without departing from the full scope of the invention as described in the appended claims.

What is claimed is:

1. A disk drive comprising:
   a housing;
   a spindle shaft mounted for rotation to said housing, said spindle shaft having an opening therein located at the axis of rotation, said opening having a closed end and an open end;
   a hub mounted to said spindle shaft so that the hub can rotate with said spindle shaft;
   a magnetized pin fixedly attached to said housing and extending into the opening in the spindle shaft;
   a selected amount of magnetic and conductive fluid located within said opening;
   a disk mounted on said hub;
   one or more transducers; and
   actuator means for moving the transducer over the surface of the disk.

2. The disk drive of claim 1 wherein the pin is magnetized along only a portion of its length.

3. The disk drive of claim 2 wherein the pin is magnetized so that one pole of the magnetized portion is located near the closed end of the opening and the other pole of the magnetized portion occurs near the open end of the opening.

4. A disk drive comprising:
   a housing further comprising a base and a cover portion;
   a hub assembly including a spindle shaft having two ends and a magnetized portion between said two ends, each of said ends attached to said housing, said hub assembly having a rotating portion which rotates about said spindle shaft;
   a cup attached to said rotating portion of said hub assembly, said cup having an opening therein through which the spindle shaft passes; and
   a magnetic, electrically conductive fluid contained within said cup.

5. The disk drive of claim 4 wherein the cup and top are a ferromagnetic material.

6. The disk drive of claim 4 further comprising a top having a thickness which is attached to said cup, said top having an opening therein through which the spindle shaft passes.

7. The disk drive of claim 6 wherein the magnetized portion of the spindle shaft has one pole that is near the opening in the cup and another pole that is near the opening in the top, said magnetic, electrically conductive fluid forming a magnetic seal at the opening in the cup and at the opening in the top.

8. The disk drive of claim 7 wherein the magnetized portion of the spindle shaft has a length equal to the distance between the bottom of the cup and the bottom of the top and about two thirds of the thickness of the top of the cup.

9. The disk drive of claim 4 further comprising a top which is attached to the rotating portion of said hub assembly, said top having an opening therein through which the spindle shaft passes.

10. The disk drive of claim 9 wherein the cup and top are a ferromagnetic material.

11. The disk drive of claim 9 wherein the top fits onto the cup attached to the rotating portion.

12. The disk drive of claim 4 wherein the magnetized portion of the spindle shaft includes a magnet which is mechanically bonded between the ends of the spindle shaft.

13. A grounding apparatus comprising:
   a first portion which is substantially fixed;
   a second portion which rotates with respect to the first portion;
   a pin which is attached to one of either the first portion or the second portion, said pin made of a material which can be magnetized and including a magnetized portion;
   the other of either the first portion or the second portion having art opening therein positioned for receiving the magnetized portion of said pin; and
   a magnetic, conductive fluid placed in said opening.

14. The grounding apparatus of claim 13 wherein the magnetized portion of the pin has two poles, one of said poles positioned near the opening in the other of either the first portion or the second portion.

15. A grounding apparatus comprising:
   a first shaft portion made of a material capable of being magnetized which is substantially fixed and electrically connected to a body having a voltage associated therewith;
   a second portion which rotates about a magnetized portion of said first shaft portion, said second portion further comprising:
   a cup attached to said second portion, said cup having an opening therein having a diameter which is larger than the diameter of the first shaft portion; and
   a magnetic, conductive fluid in said cup for providing a seal between the opening in the cup and said first shaft portion and for conducting electrical charges from said second portion to said first portion to keep the voltage associated with the second portion near the voltage associated with the body.

16. Method of assembling a disk drive having a housing which is comprised of a base and a cover, said cover including a pin attached thereto, said pin made of a material which can be magnetized, said disk drive also having a spindle shaft that rotates and disks attached to the rotating spindle shaft to form a rotating portion of the disk drive, said spindle shaft also having an opening therein which receives the pin attached to the cover, said method of assembling including the steps of:

magnetizing portion of said pin;

placing a selected amount of magnetic, electrically conductive fluid in the opening in the spindle shaft; and positioning the cover of the disk drive onto the base so that the magnetized portion of the pin passes into the opening in the rotating portion of the disk drive.

17. Method of assembling a disk drive having a housing which is comprised of a base and a cover, said disk drive also having a fixed spindle shaft having both ends attached to the housing and a rotating portion with at least one disk attached to the rotating portion, said spindle shaft including a magnetic section, said method of assembling including the steps of:

attaching a cup having an opening therein to the rotating portion of the disk drive;

placing the cup and rotating portion onto the spindle shaft so that one of the poles of the magnetic section of the spindle shaft is proximate the opening in the cup; and adding a selected amount of magnetic, electrically conductive fluid to the cup.

18. The method of assembly of claim 17 further comprising the step of placing a top to the cup onto the cup.

19. A disk drive comprising:

a housing further comprising a base and a cover portion;

a hub assembly including a spindle shaft having two ends and a magnetized portion between said two ends, each of said ends attached to said housing, said hub assembly having a rotating portion which rotates about said spindle shaft;

a cup attached to said rotating portion of said hub assembly, said cup having an opening therein through which the spindle shaft passes;

a magnetic, electrically conductive fluid contained within said cup; and a top which is attached to said cup, said top having an opening therein through which the spindle shaft passes, wherein the magnetized portion of the spindle shaft has one pole that is near the opening in the cup and another pole that is near the opening in the top, said magnetic, electrically conductive fluid forming a magnetic seal at the opening in the cup and at the opening in the top.

20. The disk drive of claim 19 wherein the magnetized portion of the spindle shaft has a length equal to the distance between the bottom of the cup and the bottom of the top and about two thirds of the thickness of the top of the cup.

* * * * *